United States Patent
Sanui et al.

(10) Patent No.: US 7,776,132 B2
(45) Date of Patent: Aug. 17, 2010

(54) MOLTEN METAL TREATMENT, METHOD FOR TREATING MOLTEN METAL, AND APPARATUS AND METHOD FOR FEEDING COVER GAS TO MOLTEN METAL

(75) Inventors: Hiroshi Sanui, Kai (JP); Yuji Nomura, Kai (JP); Hidetoshi Ohta, Kofu (JP); Shoji Sekihara, Kawasaki (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 676 days.

(21) Appl. No.: 10/546,147

(22) PCT Filed: Feb. 26, 2004

(86) PCT No.: PCT/JP2004/002276

§ 371 (c)(1),
(2), (4) Date: Aug. 22, 2005

(87) PCT Pub. No.: WO2004/076098

PCT Pub. Date: Sep. 10, 2004

(65) Prior Publication Data

US 2006/0144190 A1  Jul. 6, 2006

(30) Foreign Application Priority Data

| Feb. 28, 2003 | (JP) | 2003-053306 |
| Sep. 17, 2003 | (JP) | 2003-324816 |
| Nov. 20, 2003 | (JP) | 2003-390966 |
| Jan. 21, 2004 | (JP) | 2004-013572 |
| Jan. 21, 2004 | (JP) | 2004-013573 |

(51) Int. Cl.
C22B 26/20 (2006.01)
(52) U.S. Cl. ...................................................... 75/585
(58) Field of Classification Search .................... 75/585
See application file for complete search history.

(56) References Cited

U.S. PATENT DOCUMENTS

| 5,718,416 | A  | * | 2/1998  | Flisakowski et al. | ......... 266/217 |
| 6,167,944 | B1 |   | 1/2001  | Ricketts et al. |                    |
| 6,537,346 | B2 | * | 3/2003  | Milbrath et al. | ............... 75/585 |
| 6,630,075 | B2 | * | 10/2003 | Behr et al. | ............. 252/183.11 |
| 6,630,121 | B1 | * | 10/2003 | Sievers et al. | .............. 424/1.13 |

FOREIGN PATENT DOCUMENTS

| JP | S48-074426 A | 10/1973 |
| JP | 5-214384 | 8/1993 |
| JP | 10-231499 | 9/1998 |
| JP | 2000-501653 | 2/2000 |
| JP | 2003-531965 | 10/2003 |
| WO | 01/83836 A2 | 11/2001 |

OTHER PUBLICATIONS

International Search Report of PCT/JP2004/002276, mailed May 18, 2004.

* cited by examiner

*Primary Examiner*—Roy King
*Assistant Examiner*—Jie Yang
(74) *Attorney, Agent, or Firm*—Nixon & Vanderhye P.C.

(57) ABSTRACT

A molten metal treatment consisting of a liquid mixture in which fluorinated ketone is dissolved in liquid carbon dioxide at 0.01 to 10 wt % is put in a container, and the molten metal treatment is vaporized, and is fed as a cover gas to be contacted with the surface of a molten metal.

8 Claims, 9 Drawing Sheets

MOLTEN METAL TREATMENT, METHOD FOR TREATING MOLTEN METAL, AND APPARATUS AND METHOD FOR FEEDING COVER GAS TO MOLTEN METAL

This application is the US national phase of international application PCT/JP2004/002276, filed 26 Feb. 2004, which designated the U.S. and claims priority of JP 2003-053306, filed 28 Feb., 2003; JP 2003-324816, filed 17 Sep. 2003; JP 2003-390966, filed 20 Nov. 2003; JP 2004-013572, filed 21 Jan. 2004; JP 2004-013573, filed 21 Jan. 2004, the entire contents of each of which are hereby incorporated by reference.

TECHNICAL FIELD

The present invention relates to a molten metal treatment used for a cover gas brought into contact with the surface of molten metal, a method for treating molten metal, and an apparatus and a method for feeding cover gas to molten metal for the purpose of preventing molten metal such as molten magnesium, or a molten magnesium alloy from being oxidized and vaporized.

The present specification is based on Japanese Patent Applications (Application Nos. 2003-53306, 2003-324816, 2003-390966, 2004-13572 and 2004-13573), and the descriptions of the corresponding Japanese Patent Applications are incorporated herein.

BACKGROUND ART

When magnesium or a magnesium alloy is melted for casting, a protective gas is used as an atmospheric gas in a melting furnace in order to prevent the molten metal from being oxidized and vaporized.

The protective gas is made into a gas (cover gas) that covers the molten metal in the melting furnace. A mixed gas obtained by diluting sulfur hexafluoride with a base gas such as an inert gas may be used as the cover gas (for example, Patent Document 1).

By using the mixed gas, it is possible to reduce the oxygen concentration in the melting furnace and to prevent the molten metal from being oxidized (burning). Further, since a film composed of reaction products of sulfur hexafluoride and a metal (magnesium, etc.) is formed on the surface of the molten metal, it is possible to prevent the molten metal from being vaporized.

Patent Document 1: Japanese Translation of International Application No. 2000-501653

However, the sulfur hexafluoride employed in the prior art is designated as a greenhouse gas (greenhouse coefficient: 23900), and a substitute has been sought in view of environmental safeguards.

DISCLOSURE OF THE INVENTION

The present invention was developed in view of the above-described situation, and it is therefore an object of the invention to provide a molten metal treatment, a method for treating molten metal, and an apparatus and a method for feeding a cover gas to molten metal, which are capable of preventing the molten metal from being oxidized and vaporized and do not exert any adverse influence on the environment.

A molten metal treatment according to the invention is an agent used for a cover gas brought into contact with the surface of a molten metal and is characterized in that it is comprised of a liquid mixture in which fluorinated ketone is dissolved in a liquid carbon dioxide at 0.01 to 10 wt %.

It is preferable that fluorinated ketone is one or more which is selected from perfluorinated ketone, hydrogenated fluorinated ketone, and mixtures thereof.

Where the fluorinated ketone is perfluorinated ketone, it is preferable that the fluorinated ketone be one or more selected from the group consisting of $CF_3CF_2C(O)CF(CF_3)_2$, $(CF_3)_2CFC(O)CF(CF_3)_2$, $CF_3(CF_2)_2C(O)CF(CF_3)_2$, $CF_3(CF_2)_3C(O)CF(CF_3)_2$, $CF_3(CF_2)_5C(O)CF_3$, $CF_3CF_2C(O)CF_2CF_2CF_3$, $CF_3C(O)CF(CF_3)_2$, and perfluorocyclo-hexanone.

Where the fluorinated ketone is hydrogenated fluorinated ketone, it is preferable that the fluorinated ketone be one or more selected from the group consisting of $HCF_2CF_2C(O)CF(CF_3)_2$, $CF_3C(O)CH_2C(O)CF_3$, $C_2H_5C(O)CF(CF_3)_2$, $CF_2CF_2C(O)CH_3$, $(CF_3)_2CFC(O)CH_3$, $CF_3CF_2C(O)CHF_2$, $CF_3CF_2C(O)CH_2F$, $CF_3CF_2C(O)CH_2CF_3$, $CF_3CF_2C(O)CH_2CH_3$, $CF_3CF_2C(O)CH_2CHF_2$, $CF_3CF_2C(O)CH_2CHF_2$, $CF_3CF_2C(O)CH_2CH_2F$, $CF_3CF_2C(O)CHFCH_3$, $CF_3CF_2C(O)CHFCHF_2$, $CF_3CF_2C(O)CHFCH_2F$, $CF_3CF_2C(O)CH_3$, $CF_3CF_2C(O)CF_2CHF_2$, $CF_3CF_2C(O)CF_2CH_2F$, $(CF_3)_2CFC(O)CHF_2$, $(CF_3)_2CFC(O)CH_2F$, $CF_3CF(CH_2F)C(O)CHF_2$, $CF_3CF(CH_2F)C(O)CH_2F$, and $CF_3CF(CH_2F)C(O)CF_3$.

It is preferable that the fluorinated ketone be $C_3F_7(CO)C_2F_5$.

In the invention, the fluorinated ketone is such that at least a part of hydrogen included in ketone is substituted by fluorine.

A molten metal treatment according to the invention may be composed so as to be contained in a container in a liquid state.

The container may be composed of one or more which is selected from the group of members made of synthetic resin, at least the surface of which is made of neoprene rubber, butyl rubber, fluororubber, ethylene propylene rubber, silicone rubber, nitrile rubber, Teflon (registered trade mark), nylon, Deirin (registered trade mark), or Daiflon (registered trade mark), among those with which the molten metal treatment may be brought into contact.

A method for treating a molten metal according to the invention is characterized in that a molten metal treatment consisting of a liquid mixture having fluorinated ketone dissolved in a liquid carbon dioxide at 0.01 to 10 wt % is vaporized, and is fed as a cover gas brought into contact with the surface of the molten metal.

In the invention, it may be possible to employ a method for making a molten metal treatment, which is composed of a liquid mixture in which fluorinated ketone is dissolved in a liquid carbon dioxide at 0.01 to 10 wt %, into mist by using spraying means, simultaneously vaporizing the liquid carbon dioxide, and feeding misted fluorinated ketone as a cover gas brought into contact with the surface of a molten metal, using the carbon dioxide as a spraying propellant.

With the above-described method for treating a molten metal, the treatment may be taken out from a filled container in a liquid state in order to avoid fluctuation in the fluorinated ketone concentration of the cover gas, may be vaporized, and fed to a molten metal as a cover gas.

However, with this method, there is a problem in that the concentration of an effective constituent (fluorinated ketone) of the cover gas gradually increases in the feeding process of the cover gas.

Also, since it difficult to detect the remaining quantity of liquid treatment in a filled container from the outside thereof, almost the entire quantity of the liquid treatment in the filled container is discharged (hereinafter called an "out-of-stock state"), and there may be cases where a gas in a gas phase portion in the filled container is discharged.

The gas in a gas phase portion has a low concentration of fluorinated ketone, and if the gas is used as a cover gas as it is, there is a fear that action of protecting the molten metal may be made short.

The invention provides an apparatus and a method for feeding a cover gas for a molten metal, which are capable of achieving the following objects in view of the above circumstances:

(1) To suppress fluctuation in the concentration of effective constituents of a cover gas for a molten metal.

(2) To prevent the concentration of fluorinated ketone in the cover gas from being lowered even when a treatment in a filled container runs out of stock.

Such problem has been discovered by the present inventor for the first time, namely that the concentration of effective constituents in the cover gas gradually increases in a process of vaporizing a treatment, which is a liquid mixture including a liquid carbon dioxide as a solvent, and feeding the same as a cover gas.

As a result of study, the inventor found that such phenomenon arises for the following reasons, in which the concentration of fluorinated ketone in a cover gas gradually increases.

Since the capacity of a gas phase portion in a container increases in line with a decrease in the remaining quantity of a treatment in the filled container, the vaporizing amount of the treatment in the container is increased. Since a liquid carbon dioxide having remarkably higher vapor pressure in comparison with fluorinated ketone is vaporized with priority in the process in which the vaporizing amount is increased, the concentration of the carbon dioxide gradually increases in the gas phase portion in the container, and the concentration of fluorinated ketone gradually increases in the liquid phase portion. Therefore, the concentration of fluorinated ketone of the vaporized gas gradually increases.

The invention was developed based on this information, and the constitution thereof is described below.

An apparatus for feeding a cover gas for a molten metal according to the invention is characterized in that the apparatus comprises a filled container in which a treatment for molten metal, which is composed of a liquid mixture including a liquid carbon dioxide and fluorinated ketone is provided; a vaporizer for obtaining a vaporized gas by vaporizing the molten metal treatment; a vaporized gas flow rate regulating valve, which adjusts the flow rate of the vaporized gas; a base gas feeding portion which is a supply source of the base gas; means for detecting the concentration of fluorinated ketone of a cover gas obtained by mixing the vaporized gas and the base gas; and a control portion for controlling the flow rate of the vaporized gas by adjusting the aperture of the vaporized gas flow rate regulating valve on the basis of a detection value of the concentration detecting means.

A feeding apparatus according to the invention may be constructed so that the apparatus is provided with a vaporized gas pressure regulator for making the pressure of a vaporized gas substantially constant, a base gas pressure regulator for making the pressure of the base gas substantially constant, and a cover gas flow rate regulating valve for regulating the flow rate of the cover gas.

Also, a feeding apparatus according to the invention may be constructed so that the apparatus is provided with a vaporized gas pressure regulator for making the pressure of a vaporized gas substantially constant, a base gas pressure regulator for making the pressure of the base gas substantially constant, and a base gas flow rate regulating valve for regulating the flow rate of the base gas.

A feeding apparatus according to the invention is characterized in that the apparatus comprises: a filled container in which a molten metal treatment consisting of a liquid mixture including a liquid carbon dioxide and fluorinated ketone is provided; a treatment flow rate regulating valve for regulating the flow rate of the molten metal treatment; a vaporizer for obtaining a vaporized gas by vaporizing the molten metal treatment; a base gas feeding portion, which is a supply source of the base gas; means for detecting the concentration of fluorinated ketone of a cover gas obtained by mixing the vaporized gas and the base gas; and a control portion for controlling the flow rate of the molten metal treatment by adjusting the aperture of the treatment flow rate regulating valve on the basis of a detection value of the concentration detecting means.

An apparatus for feeding a cover gas for a molten metal is characterized in that the apparatus comprises: a filled container in which a molten metal treatment consisting of a liquid mixture including a liquid carbon dioxide and fluorinated ketone is provided; means for converting the carbon dioxide of the treatment of a molten metal in the filled container into a supercritical state; a base gas feeding portion which is a supply source of the base gas; and a mixer for obtaining a cover gas by mixing the molten metal treatment and the base gas.

It is preferable that the supercritical state-making means be means for heating the molten metal treatment in the filled container.

An apparatus for feeding a molten metal cover gas according to the invention is provided with a regulator for regulating the pressure of the molten metal treatment taken out from the filled container, and it is preferable that the supercritical state-making means be constructed so as to maintain a supercritical state of the carbon dioxide until the molten metal treatment reaches at least the pressure regulator.

A method for feeding a molten metal cover gas according to the invention is characterized in that it comprises the steps of: mixing a vaporized gas, which is obtained by vaporizing a molten metal treatment consisting of liquid carbon dioxide and fluorinated ketone, with a base gas; detecting the concentration of fluorinated ketone in the obtained cover gas; and controlling the flow rate of the vaporized gas and the molten metal treatment on the basis of the detection value.

A method for feeding a molten metal cover gas according to the invention is characterized in that it comprises the steps of: putting carbon dioxide of a molten metal treatment consisting of a liquid mixture including a liquid carbon dioxide and fluorinated ketone in a supercritical state in a filled container; thereafter taking out the molten metal treatment from the filled container and mixing the same with a base gas; and feeding the obtained cover gas to a molten metal.

It is preferable that the concentration of fluorinated ketone included in the molten metal treatment be 0.1 to 20 wt %.

It is preferable that, when putting the molten metal treatment in the filled container in a supercritical state, the temperature be 31° C. or more, and the pressure be 7.38 MPa or more.

It is preferable that the fluorinated ketone be pentafluoro-ethyl-heptafluoropropylketone.

BEST MODE FOR CARRYING OUT THE INVENTION

Figure 1:
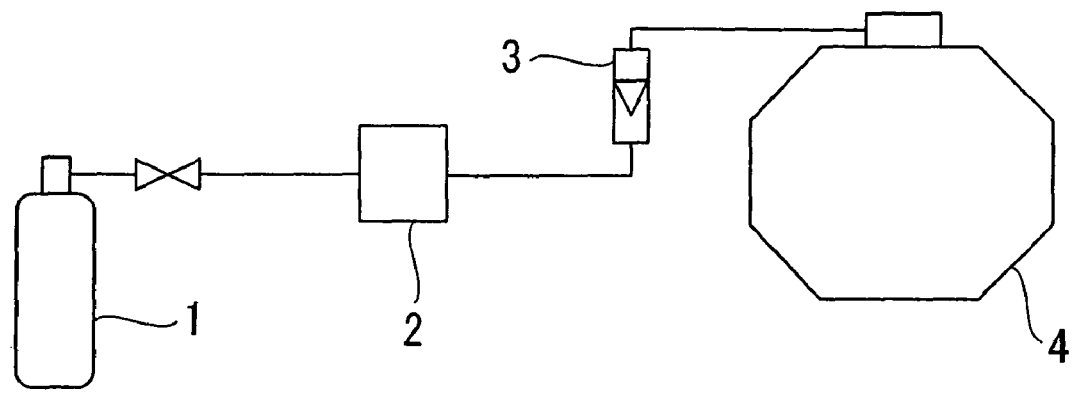
FIG. 1 is a rough schematic view depicting an apparatus by which one embodiment of a method for treating a molten metal according to the invention is carried out.

FIG. 1 is a rough schematic view depicting an apparatus by which one embodiment of a method for treating a molten metal according to the invention is carried out.

In FIG. 1, reference numeral 1 denotes a pressure container (filled container) in which a molten metal treatment is provided, reference numeral 2 denotes a vaporizer for vaporizing the molten metal treatment; reference numeral 3 denotes a flow meter for detecting the flow rate of the molten metal treatment; and reference numeral 4 denotes a melting furnace for melting a metal which is to become an object.

The pressure container 1 is filled with a liquid molten metal treatment.

The molten metal treatment is composed of a liquid mixture in which fluorinated ketone is dissolved in a liquid carbon dioxide.

It is preferable that fluorinated ketone be one or more selected from perfluorinated ketone, hydrogenated fluorinated ketone, and mixtures thereof.

It is preferable that the carbon number be 5 to 9 in the case of perfluorinated ketone.

It is preferable that the perfluorinated ketone be one or more which is selected from the group consisting of $CF_3CF_2C(O)CF(CF_3)_2$, $(CF_3)_2CFC(O)CF(CF_3)_2$, $CF_3(CF_2)_2C(O)CF(CF_3)_2$, $CF_3(CF_2)_3C(O)CF(CF_3)_2$, $CF_3(CF_2)_5C(O)CF_3$, $CF_3CF_2C(O)CF_2CF_2CF_3$, $CF_3C(O)CF(CF_3)_2$, and perfluorocyclo-hexanone. That is, one of these may be used, or two or more may be mixed and used.

It is preferable that the carbon number be 4 to 7 in the case of hydrogenated fluorinated ketone.

It is preferable that the hydrogenated fluorinated ketone be one or more selected from the group consisting of $HCF_2CF_2C(O)CF(CF_3)_2$, $CF_3C(O)CH_2C(O)CF_3$, $C_2H_5C(O)CF(CF_3)_2$, $CF_2CF_2C(O)CH_3$, $(CF_3)_2CFC(O)CH_3$, $CF_3CF_2C(O)CHF_2$, $CF_3CF_2C(O)CH_2F$, $CF_3CF_2C(O)CH_2CF_3$, $CF_3CF_2C(O)CH_2CH_3$, $CF_3CF_2C(O)CH_2CHF_2$, $CF_3CF_2C(O)CH_2CHF_2$, $CF_3CF_2C(O)CH_2CH_2F$, $CF_3CF_2C(O)CHFCH_3$, $CF_3CF_2C(O)CHFCHF_2$, $CF_3CF_2C(O)CHFCH_2F$, $CF_3CF_2C(O)CF_2CH_3$, $CF_3CF_2C(O)CF_2CHF_2$, $CF_3CF_2C(O)CF_2CH_2F$, $(CF_3)_2CFC(O)CHF_2$, $(CF_3)_2CFC(O)CH_2F$, $CF_3CF(CH_2F)C(O)CHF_2$, $CF_3CF(CH_2F)C(O)CH_2F$, and $CF_3CF(CH_2F)C(O)CF_3$. That is, one of these may be used, or two or more may be mixed and used.

Among these, it is particularly preferable that pentafluoro-ethyl-heptafluoropropyl ketone, that is, $C_3F_7(CO)C_2F_5$ (for example, $CF_3CF_2C(O)CF(CF_3)_2$, $CF_3CF_2C(O)CF_2CF_2CF_3$) be used.

It is preferable that the molecular weight of the fluorinated ketone be 250 or more (preferably 300 or more). By using a compound whose molecular weight is in this range, the fluorinated ketone in the molten metal treatment easily becomes uniform with respect to liquid carbon dioxide.

It is preferable that the number of carbonyl radicals included in one molecule of fluorinated ketone be 1.

The concentration of fluorinated ketone is made to be 0.01 to 10 wt % (preferably 0.05 to 5 wt %). By setting the concentration of the fluorinated ketone in this range, it is possible to surely prevent the molten metal from being oxidized and vaporized, and at the same time, it is possible to prevent harmful substances from being generated.

If the concentration of fluorinated ketone is less than the above-described range, formation of a film consisting of reaction products brought about by the fluorinated ketone and a molten metal (magnesium, etc.) is made insufficient, and oxidization and vaporization of the molten metal easily occur. If the concentration of fluorinated ketone exceeds the above-described range, harmful substances such as $COF_2$, etc., are easily generated.

Also, fluorinated ketone is usually a liquid at a normal temperature. Therefore, it is necessary to vaporize fluorinated ketone in order for it to be mixed with carbon dioxide.

It is preferable that the concentration of liquid carbon dioxide be 90 to 99.99 wt % (preferably, 95 to 99.95 wt %).

The molten metal treatment may include constituents other than the liquid carbon dioxide and fluorinated ketone.

As the other constituents, oxygen ($O_2$) may be listed. It is preferable that the concentration of oxygen ($O_2$) be 0.4 to 10 ml/L (preferably, 0.6 to 10 ml/L). By setting the oxygen ($O_2$) concentration in this range, it is possible to prevent harmful substances (for example, perfluoroisobutylene (PFIB), $COF_2$, HF, etc.,) from being generated, and the molten metal can be prevented from being oxidized.

Fluorinated ketone can be synthesized by a reaction of fluorocarbon acid and Grignard reagent.

The liquid molten metal treatment provided in the pressure container 1 is called a "molten metal treatment filled in a container."

A container used for storage of liquid carbon dioxide may be employed as the pressure container 1.

Usually, in the pressure container 1, a synthetic resin material may be used for packing of valves.

It is preferable that a member, made of a synthetic resin (packing of valves), of the members, which are brought into contact with the molten metal treatment when taking out the molten metal treatment from the pressure container 1, be composed of one or more which is selected from the group of members made of synthetic resin, at least the surface of which is made of neoprene rubber, butyl rubber, fluororubber, ethylene propylene rubber, silicone rubber, nitrile rubber, Teflon (registered trade mark), nylon, Delrin (registered trade mark), or Daiflon (registered trade mark).

By using these synthetic resin materials since the synthetic resin materials do not substantially deteriorate due to the fluorinated ketone, it is possible to prevent the packing of valves of the pressure container 1 from deteriorating due to the fluorinated ketone, and the flow rate for supply can be accurately determined. In addition, these materials may be employed not only for valves of the pressure container 1 but also for a system of feeding the molten metal treatment to a melting furnace.

In order to provide the molten metal treatment to the pressure container 1, it is preferable that the fluorinated ketone be first supplied into the pressure container 1, and next a liquid carbon dioxide be supplied into the pressure container 1.

By supplying the liquid carbon dioxide, which is used in a comparatively large quantity, after the fluorinated ketone, it is possible to sufficiently mix the liquid carbon dioxide and fluorinated ketone when supplying the liquid carbon dioxide and to make them uniform.

Next, a description is given of a method for treating a molten metal using the above-described apparatus.

A metal such as magnesium or a magnesium alloy is put into the melting furnace 4, and is heated and melted. The temperature in the melting furnace 4 may be 600 to 800° C.

The molten metal treatment in the pressure container 1 is taken out as it is in a liquid state, and is introduced into the vaporizer 2 and is vaporized therein.

The gaseous molten metal treatment thus obtained is fed into the melting furnace 4 via a flow meter 3. The molten metal treatment is provided to the melting furnace 4 and is made into an atmospheric gas (cover gas) which is brought into contact with the surface of the molten metal.

Fluorinated ketone in the molten metal treatment reacts with the molten magnesium or the like, and a film consisting of $MgF_2$ or the like is formed on the surface of the molten metal. With this film, it is possible to prevent the molten metal from being oxidized (burnt).

The molten metal can be made into a metal molded article by casting.

The above-described molten metal treatment is composed of a liquid mixture in which fluorinated ketone is dissolved in a liquid carbon dioxide at 0.01 to 10 wt %.

Fluorinated ketone has a lower greenhouse effect and is a substance which is easily decomposed in the atmosphere. Therefore, it can prevent adverse influence on the environment.

Further, since fluorinated ketone and liquid carbon dioxide which are mixed in advance are used, the mixing ratio of the fluorinated ketone and liquid carbon dioxide can be made constant without fail in comparison with a case where fluorinated ketone and liquid carbon dioxide supplied by separate systems are mixed immediately before use.

Therefore, it is possible to accurately determine the concentration of fluorinated ketone of the molten metal treatment supplied to the melting furnace 4. Accordingly, it is possible to surely prevent the molten metal from being oxidized and vaporized, and it is possible to suppress generation of harmful substances ($COF_2$, etc.). Also, a decrease in cost can be achieved.

In contrast, in a case where fluorinated ketone and liquid carbon dioxide are supplied by separate systems and are mixed immediately before use, since the feeding amount of fluorinated ketone is made small, it becomes necessary to strictly control the flow rate adjustment, wherein a remarkable increase in facility costs such as for precise pumps results.

Since a small amount of fluorinated ketone and a great deal of liquid carbon dioxide are mixed in the above-described molten metal treatment, it is possible to reduce the concentration of fluorinated ketone in a leakage gas to a permissible concentration or lower even if the treatment leaks from the pressure container 1. Therefore, it is advantageous in view of safety, and it is preferable in terms of ease in handling.

In contrast, since a high concentration of fluorinated ketone is used where fluorinated ketone and liquid carbon dioxide are supplied by separate systems, equipment to secure safety is required, and this is disadvantageous in terms of handling.

Figure 2:
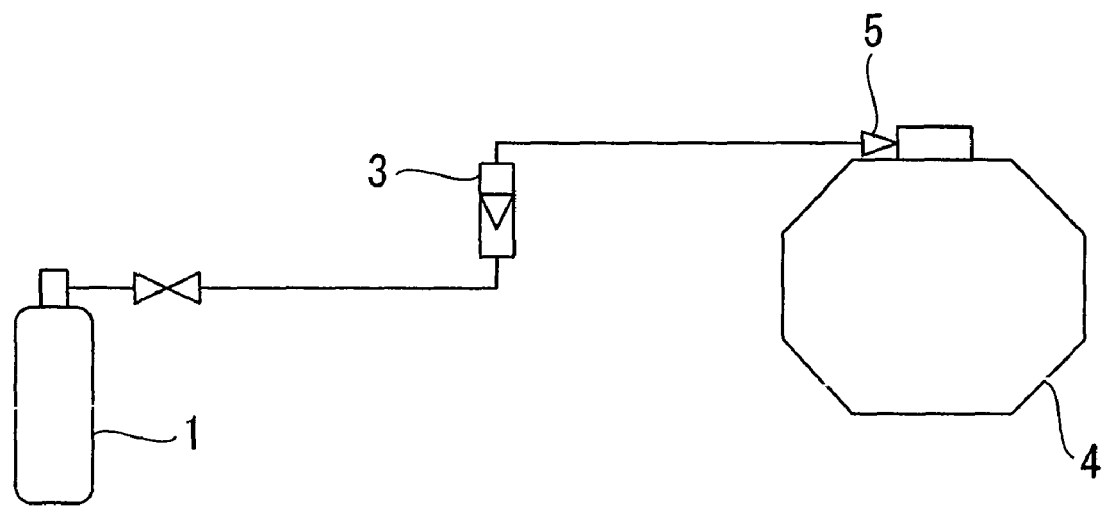
FIG. 2 is a rough schematic view depicting an apparatus by which another embodiment of a method for treating a molten metal according to the invention is carried out.

FIG. 2 depicts an apparatus by which another embodiment of a method for treating a molten metal according to the invention is carried out.

The treating apparatus depicted therein differs from the treating apparatus depicted in FIG. 1 in that it is not provided with a vaporizer 2 and a spraying nozzle 5 (spraying means) is disposed in a feeding pipe.

Hereinafter, a description is given of a method for treating a molten metal using the above-described apparatus.

A molten metal treatment in the pressure container 1 is made into mist by the spraying nozzle 5 and is fed into the melting furnace 4. At this time, the liquid carbon dioxide is vaporized and functions as a spraying propellant to accelerate the flow of the misted fluorinated ketone, so that the misted fluorinated ketone can be efficiently fed into the melting furnace 4.

The misted fluorinated ketone is vaporized, and the mixed gas of fluorinated ketone and carbon dioxide is made into an atmospheric gas (cover gas) in the melting furnace 4.

According to the treating method, since a molten metal treatment is made into mist by the spraying nozzle 5 and is fed into the melting furnace 4, the molten metal treatment can be easily vaporized.

Therefore, heat energy required for vaporization of the molten metal treatment can be reduced, and it is possible that any vaporizer is eliminated, depending on the concentration of the fluorinated ketone.

Figure 3:
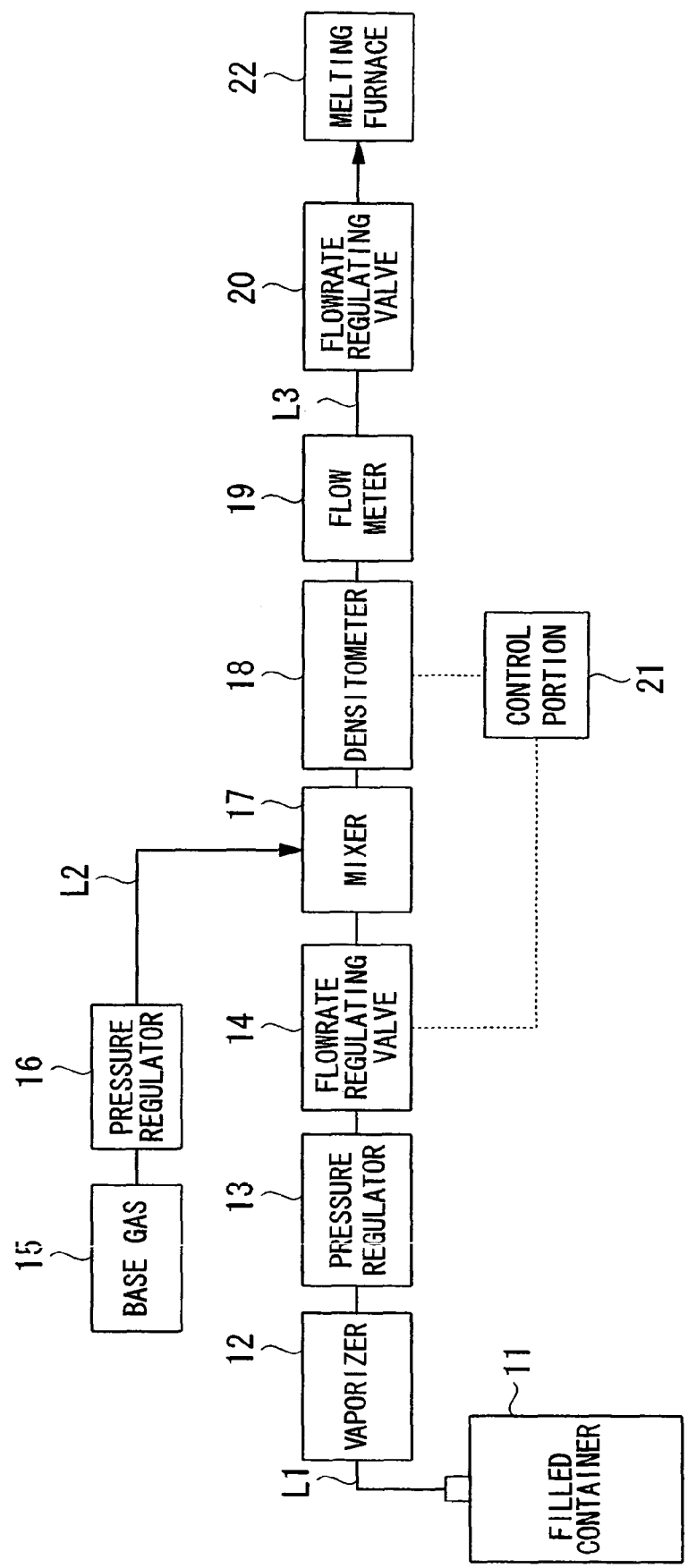
FIG. 3 is a rough schematic view depicting one example of an apparatus for feeding a cover gas according to the invention.

FIG. 3 depicts one example of a cover gas feeding apparatus according to the invention.

In the drawing, reference numeral 11 denotes a filled container being a pressure container in which a molten metal treatment (hereinafter it may be merely called a "treatment") is supplied. Reference numeral 12 denotes a vaporizer for obtaining a vaporized gas by vaporizing the above-described treatment. Reference numeral 13 denotes a vaporized gas pressure regulator for making the pressure of the vaporized gas substantially constant. Reference numeral 14 denotes a vaporized gas flow rate regulating valve for regulating the flow rate of the vaporized gas. Reference numeral 15 denotes a base gas feeding portion which is a supply source of the base gas. Reference numeral 16 denotes a base gas pressure regulator for making the pressure of the base gas substantially constant. Reference numeral 17 denotes a mixer for obtaining a cover gas in which the vaporized gas and base gas are mixed. Reference numeral 18 denotes a densitometer (concentration detecting means) for detecting the concentration of fluorinated ketone of the cover gas obtained by the mixer 17. Reference numeral 19 denotes a cover gas flow meter for detecting the flow rate of the cover gas. Reference numeral 20 denotes a cover gas flow rate regulating valve for regulating the flow rate of the cover gas. Reference numeral 21 denotes a control portion for controlling the flow rate of the vaporized gas based on a detection value of the densitometer 18. Reference numeral 22 denotes a melting furnace having a molten metal accommodated therein. Furthermore, generation of harmful substances can be suppressed.

A molten metal treatment which is liquefied is provided in the filled container 11. The treatment is composed of a liquid mixture in which fluorinated ketone is mixed in a liquid carbon dioxide. The above-described compounds may be used as fluorinated ketone.

It is preferable that the concentration of fluorinated ketone of the treatment in the filled container 11 be 0.1 to 10 wt % (preferably, 0.4 to 8 wt %).

By setting the concentration of fluorinated ketone in this range, it is possible to sufficiently increase the concentration of fluorinated ketone in the gas phase portion in the filled container 11.

Therefore, the concentration of fluorinated ketone in the vaporized gas after almost all the amount of the liquid treatment is taken out from the filled container 11 (hereinafter called "out-of-stock") can be made sufficiently high, and it is possible to prevent the molten metal protection effect of the cover gas (an effect of preventing the molten metal from being oxidized and vaporized) from becoming short-lived. Furthermore, generation of harmful substances can be suppressed.

For example, by setting the concentration of fluorinated ketone of the treatment to 0.1 wt % or more, it is possible for the concentration of fluorinate ketone of the cover gas after running out-of-stock to be kept at 50 ppm or more. Also, by setting the concentration of fluorinated ketone of the treatment to 0.4 wt % or more, it is possible for the concentration of fluorinated ketone of the cover gas after running out-of-stock to be kept at 100 ppm or more, wherein ppm is a capacity standard (μl/l).

If the concentration of fluorinated ketone is less than the above-described range, the concentration of fluorinated ketone of the cover gas after running out-of-stock is made lower, wherein there may be a fear that the molten metal protection effect becomes insufficient.

There is an advantage in that the refilling frequency of the container 11 can be decreased in line with an increase in the concentration of fluorinated ketone. However, if the concentration thereof exceeds the above-described range, the liquid carbon dioxide and fluorinated ketone may be easily separated from each other in piping, and the treatment introduced into the vaporizer 12 made uneven, so that the concentration of fluorinated ketone is apt to easily change. Also, harmful substances such as $COF_2$, etc., are easily generated.

It is preferable that the concentration of the liquid carbon dioxide be 90 to 99.99 wt % (preferably, 95 to 99.95 wt %).

The treatment may contain constituents other than the liquid carbon dioxide and fluorinated ketone. As the other constituents described above, oxygen ($O_2$) may be listed. It is preferable that the concentration of oxygen ($O_2$) be 0.4 to 10 ml/L (preferably, 0.6 to 10 ml/L).

By setting the concentration of oxygen ($O_2$) in this range, it is possible to prevent harmful substances (for example, perfluoroisobuthylene (PFIB), $COF_2$, HF, etc.,) from being generated, and possible to prevent the molten metal from being oxidized.

Fluorinated ketone may be synthesized by a reaction of fluorocarbon acid and Grignard reagent.

Next, a description is given of a method for feeding a cover gas into a melting furnace 22 using the above-described apparatus.

A metal such as magnesium or a magnesium alloy is put into the melting furnace 22, and is heated and melted. The temperature in the melting furnace 22 may be 600 to 800° C.

The treatment in the filled container 11 is taken out through a channel L1, utilizing a conduit reaching the vicinity of the bottom of the filled container 11.

Since the fluorinated ketone contained in the treatment in the filled container 11 has a higher boiling point than carbon dioxide, the ratio of fluorinated ketone is made lower in the gas phase portion in the container 11 than in the liquid phase portion thereof. Therefore, when taking out the treatment from the filled container 11, it is necessary to take out the treatment from the liquid phase portion in the filled container 11.

The treatment is introduced into the vaporizer 12 and is vaporized therein to obtain a vaporized gas.

Further, in the present specification, a gas passed through the vaporizer 12 is called a "vaporized gas" regardless of whether or not the treatment taken out from the filled container 11 is liquid.

The vaporized gas is introduced into the mixer 17 via the flow rate regulating valve 14 after it is adjusted to substantially constant pressure by the pressure regulator 13.

Simultaneously, the base gas from the base gas feeding portion 15 is introduced into the mixer 17 through a channel L2 after it is adjusted to substantially constant pressure by the pressure regulator 16.

It is preferable that the base gas have a lower reactivity and a larger specific weight than air. The reason why it is preferable that the specific weight be large resides in that, if the specific weight is lower, the cover gas flows due to updraft produced in the melting furnace 22 and the action of protecting the molten metal is degraded.

It is preferable that the base gas be one or more of carbon dioxide and argon gas. Also, air or nitrogen may be used as the base gas.

A static mixer may be used as the mixer 17 or a mere branch pipe may be used, in which a pipe for a vaporized gas and a pipe for a base gas are connected to each other.

A mixed gas obtained by mixing the base gas and vaporized gas using the mixer 17 is fed into the melting furnace 22 through a channel L3, as a cover gas which covers the surface of the molten metal, passing through the densitometer 18, the flow meter 19, and the flow rate regulating valve 20.

In order to sufficiently obtain the molten metal protection effect, it is preferable that the concentration of fluorinated ketone of the cover gas be 50 ppm or more (preferably, 100 pm or more).

Also, it is preferable that the concentration of fluorinated ketone of the cover gas be 1000 ppm or less (preferably, 500 ppm or less). By setting the concentration of fluorinated ketone in this range, it is possible to suppress generation of harmful substances ($COF_2$, etc.).

The flow rate of the cover gas fed into the melting furnace 22 can be established at a predetermined value by using the flow rate regulating valve 20.

Since the capacity of the gas phase portion in the container 11 is increased in line with a decrease in the remaining amount of the treatment in the filled container 11, the vaporizing amount of the treatment in the container 11 is increased. Since, in the process in which the vaporizing amount is increased, liquid carbon dioxide having remarkably higher vapor pressure than fluorinated ketone is vaporized with priority, the concentration of carbon dioxide is gradually increased in the gas phase portion in the container 11, and the concentration of fluorinated ketone is gradually increased in the liquid phase portion. For this reason, the concentration of fluorinated ketone of the vaporized gas is gradually increased.

Figure 4:
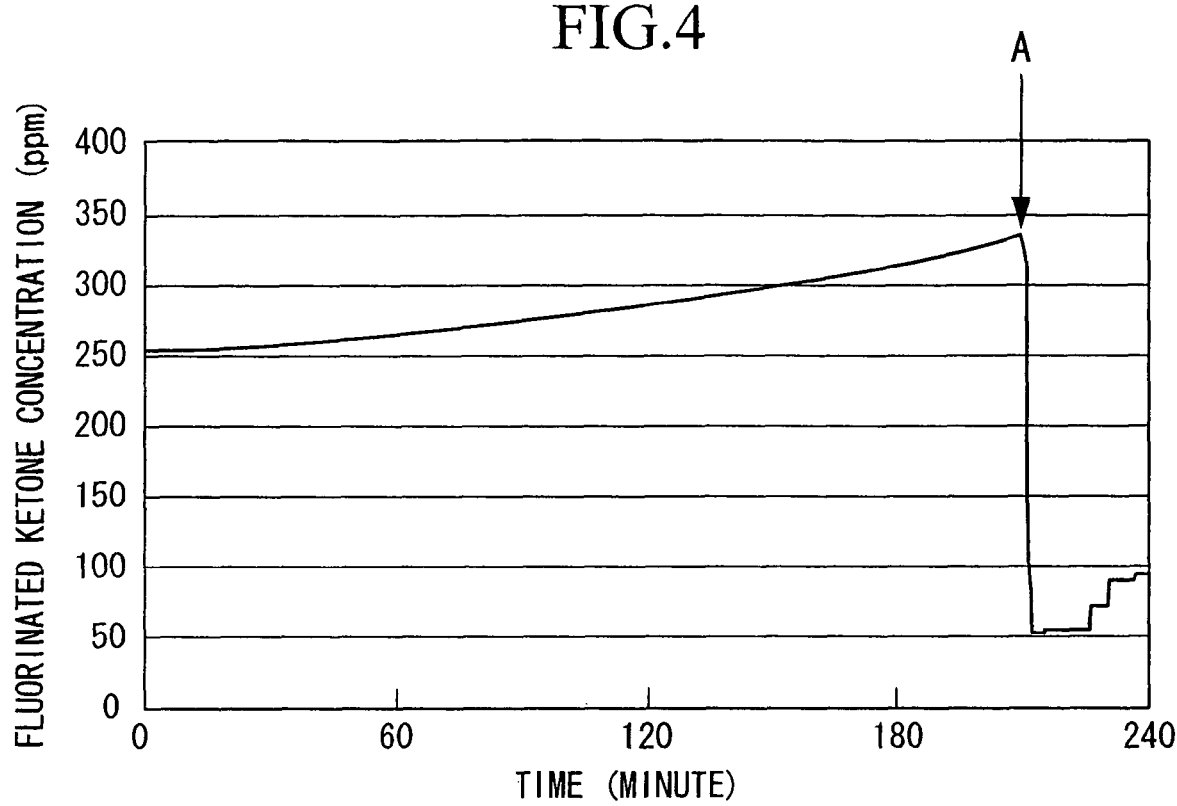
FIG. 4 is a graph depicting the results of tests.

FIG. 4 depicts an example of changes in the concentration of fluorinated ketone when feeding a vaporized gas at a rate of 10 liters per minute. In the example depicted herein, although the concentration of fluorinated ketone in the vaporized gas is approximately 250 ppm at the beginning of use, it gradually increases and reaches approximately 330 ppm.

As described above, since a gas existing in the gas phase portion in the container 11 has a low concentration of fluorinated ketone, the concentration of fluorinated ketone of the vaporized gas is lowered to approximately 50 ppm at the time of running out of stock as shown by reference letter A.

After the treatment runs out of stock, the pressure in the filled container 11 is gradually decreased, and the remaining amount of gas in the filled container 11 can be estimated by the pressure.

In the feeding method, the concentration of fluorinated ketone of the cover gas can be detected by the densitometer 18, and the aperture of the flow rate regulating valve 14 adjusted by the control portion 21 on the basis of the value of detection, whereby the flow rate of the vaporized gas can be controlled.

Where the concentration of fluorinated ketone of the vaporized gas introduced into the mixer 17 is increased, the aperture of the flow rate regulating valve 14 is decreased in response to the magnitude of the increase, and the flow rate of the vaporized gas is decreased, wherein the amount of fluorinated ketone introduced into the mixer 17 per unit time is kept substantially constant.

Since the flow rate of feeding cover gas introduced into the melting furnace 22 is made substantially constant by the flow rate regulating valve 20 for the cover gas, the flow rate of base gas introduced into the mixer 17 through the channel L2 is increased due to a decrease in the flow rate of the vaporized gas.

On the other hand, where the concentration of fluorinated ketone of the vaporized gas introduced into the mixer 17 is lowered, the aperture of the flow rate regulating valve 14 is increased in response to the magnitude of the lowering, and the flow rate of the base gas introduced into the mixer 17 through the channel L2 is decreased due to an increase in the flow rate of the vaporized gas.

Accordingly, the concentration of fluorinated ketone of the cover gas fed into the melting furnace 22 can be made substantially constant, and the molten metal protection effect can be obtained in a stabilized state.

After the treatment runs out of stock in the filled container 11, a gas in the filled container 11 is taken out through the channel L1.

As described above, since the concentration of fluorinated ketone of the treatment in the filled container 11 is established in the above-described range (0.1 to 10 wt %), the concentration of fluorinated ketone in the gas phase portion is sufficiently high.

Therefore, although the concentration of fluorinated ketone of the vaporized gas is lowered to a large extent when the treatment runs out of stock, it is possible to prevent the concentration of fluorinated ketone of the cover gas from becoming inadequate.

The fluorinated ketone in the cover gas fed into the melting furnace 22 reacts with a molten metal (magnesium, etc.), and a film composed of $MgF_2$, etc., is formed on the surface of the molten metal. With the film, it is possible to prevent the molten metal from being oxidized (burning) and vaporized.

The molten metal can be made into a metal molded article by casting, etc.

The above-described apparatus for feeding a cover gas brings about the following effects.

(1) Since the flow rate of the vaporized gas is controlled on the basis of a detection value of the concentration of fluorinated ketone of the cover gas, it is possible to suppress fluctuation in the concentration of fluorinated ketone of the cover gas fed into the melting furnace 22.

Accordingly, the problem in a case where a liquid treatment including liquid carbon dioxide as a solvent is used, that is, a problem of the concentration of fluorinated ketone being gradually increased in the process of feeding a cover gas, can be solved, and a stabilized effect of protecting the molten metal can be brought about.

(2) Since fluctuation in the concentration of fluorinated ketone of the cover gas can be suppressed, it is possible to suppress the amount of use of fluorinated ketone, and this is advantageous in view of costs.

(3) Since the only thing which must be controlled is only the flow rate of vaporized gas, it is not necessary to control the flow rate of the base gas. Therefore, the apparatus configuration can be simplified, and facility costs can be reduced.

In contrast, where the flow rates of both the vaporized gas and the base gas are controlled, the control portion is required to include a calculation function to make the total amount of the vaporized gas and base gas fixed, and a disadvantage is brought about in terms of facility costs.

(4) By setting the concentration of fluorinated ketone of the treatment in a range from 0.1 to 10 wt % (preferably, 0.4 to 8 wt %), it is possible to sufficiently increase the concentration of fluorinated ketone in the gas phase portion in the filled container 11.

Therefore, since the concentration of fluorinated ketone of the vaporized gas can be made sufficiently high after the treatment runs out of stock, it is possible to prevent the molten metal protection effect of the cover gas from becoming short-lived.

In addition, since fluorinated ketone in the gas phase portion in the filled container 11 can be utilized without any waste after the treatment runs out of stock, this is advantageous in view of costs.

(5) The concentration of fluorinated ketone of the cover gas is made to be a value responsive to the flow rate of the vaporized gas, not depending on the flow rate of the cover gas. Therefore, according to a configuration in which the vaporized gas pressure regulator 13, base gas pressure regulator 16 and cover gas flow rate regulating valve 20 are provided by setting the flow rate for feeding the cover gas to a predetermined value by using the flow rate regulating valve 20, it is possible to increase and decrease the flow rate of the base gas so as to prevent fluctuation in the flow rate of the vaporized gas even if the vaporized gas is increased or decreased.

Accordingly, it is possible to make the concentration of fluorinated ketone of the cover gas fed into the melting furnace 22 substantially constant regardless of the flow rate for feeding of the cover gas into the melting furnace 22.

(6) Since the concentration of fluorinated ketone of the vaporized gas can be made sufficiently high, after the treatment runs out of stock, by setting the concentration of fluorinated ketone of the treatment in the above-described range, it is possible to continue feeding of the cover gas after the treatment runs out of stock.

Since the pressure in the filled container 11 is gradually decreased after the treatment runs out of stock, the remaining amount of gas in the filled container 11 can be estimated by detecting the pressure using pressure-detecting means (not illustrated) disposed in the channel L1. Therefore, it becomes easy to establish the re-filling time of the container 11.

(7) Since fluorinated ketone is easily decomposed and has a low greenhouse effect, it is favorable in view of environmental safeguards. Also, carbon dioxide has a lower greenhouse effect and is excellent in environmental safeguards, and its reactivity is low. Therefore, no adverse influence is exerted on the molten metal.

In the invention, it is possible to make the flow rate of liquid treatment a target for control.

For example, a construction is possible, in which a flow rate regulating valve (not illustrated) for the above-described liquid treatment is provided between the filled container 11 and the vaporizer 12.

In the case of using the apparatus, since the concentration of fluorinated ketone of the cover gas is detected by the densitometer 18 and the aperture of the treatment flow rate regulating valve is adjusted by the control portion 21 based on the detection value, the flow rate of the treatment is controlled, and the amount of fluorinated ketone introduced into the mixer 17 per unit time can be made substantially constant.

With the apparatus, it is possible to prevent the concentration of fluorinated ketone of the cover gas fed into the melting furnace 22 from fluctuating as in the above-described method.

Figure 5:
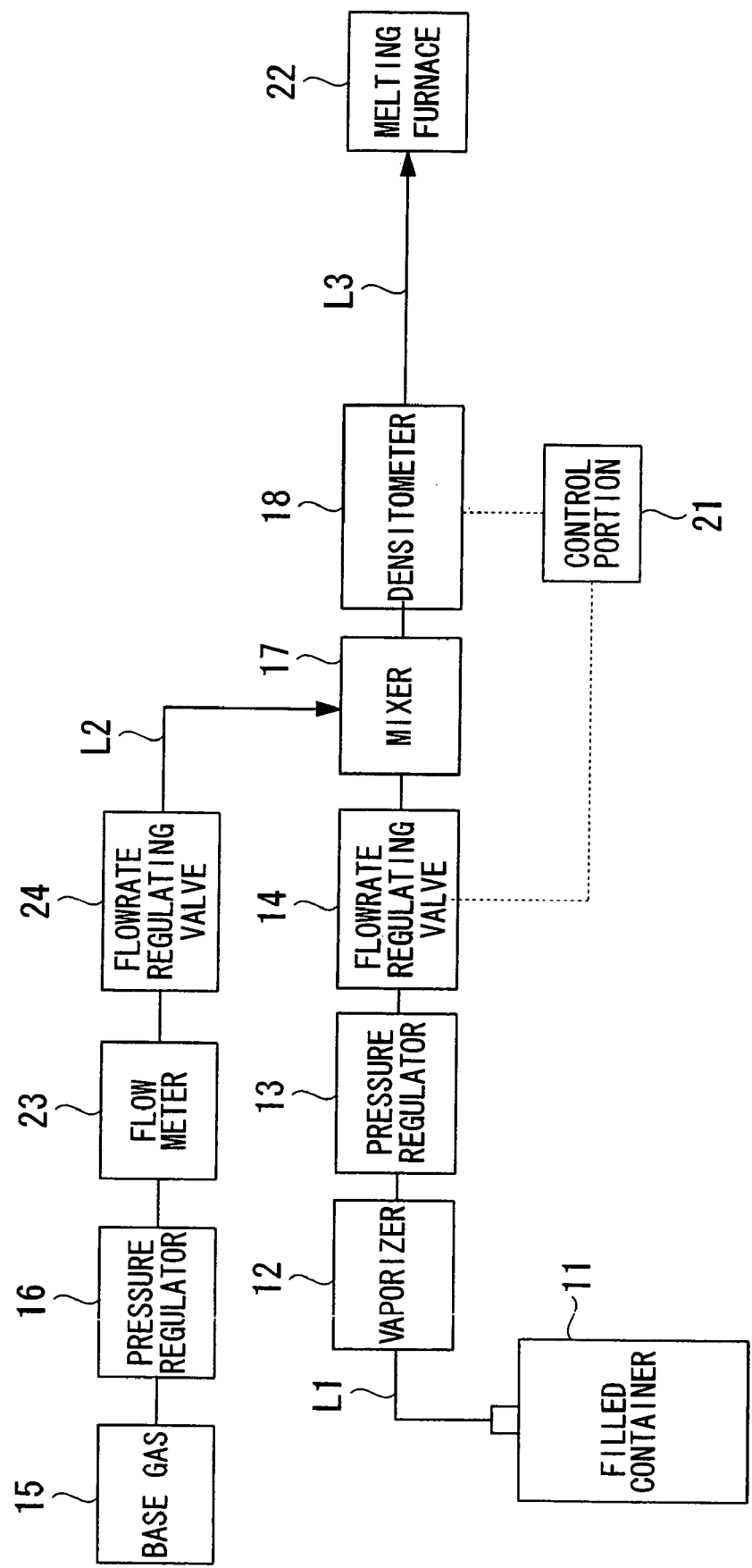
FIG. 5 is a rough schematic view depicting another example of an apparatus for feeding a cover gas according to the invention.

FIG. 5 depicts another example of the feeding apparatus according to the invention.

The feeding apparatus differs from the feeding apparatus depicted in FIG. 3 in that, with respect to the channel L2, although it is not provided with the flow meter 19 and flow rate regulating valve 20 for a cover gas, it is provided with a base gas flow meter 23 and a base gas flow rate regulating valve 24.

With the feeding apparatus, it is possible to set the flow rate of the base gas to a predetermined value by using the flow rate regulating valve 24.

In a case of using the apparatus, since the concentration of fluorinated ketone of the cover gas is detected by the densitometer 18 and the aperture of the flow rate regulating valve 14 is adjusted by the control portion 21 based on the detection value as in the above-described method, the flow rate of vaporized gas is controlled, and the concentration of fluorinated ketone introduced into the mixer 17 per unit time can be made substantially constant.

With the apparatus, since the flow rate of the base gas can be made substantially constant by the flow rate regulating valve 24, it is possible to prevent the concentration of fluorinated ketone of the cover gas fed into the melting furnace 22 from fluctuating in cases where the concentration of fluorinated ketone of the vaporized gas is sufficiently high (for example, 0.1 to 10 wt %).

Figure 6:
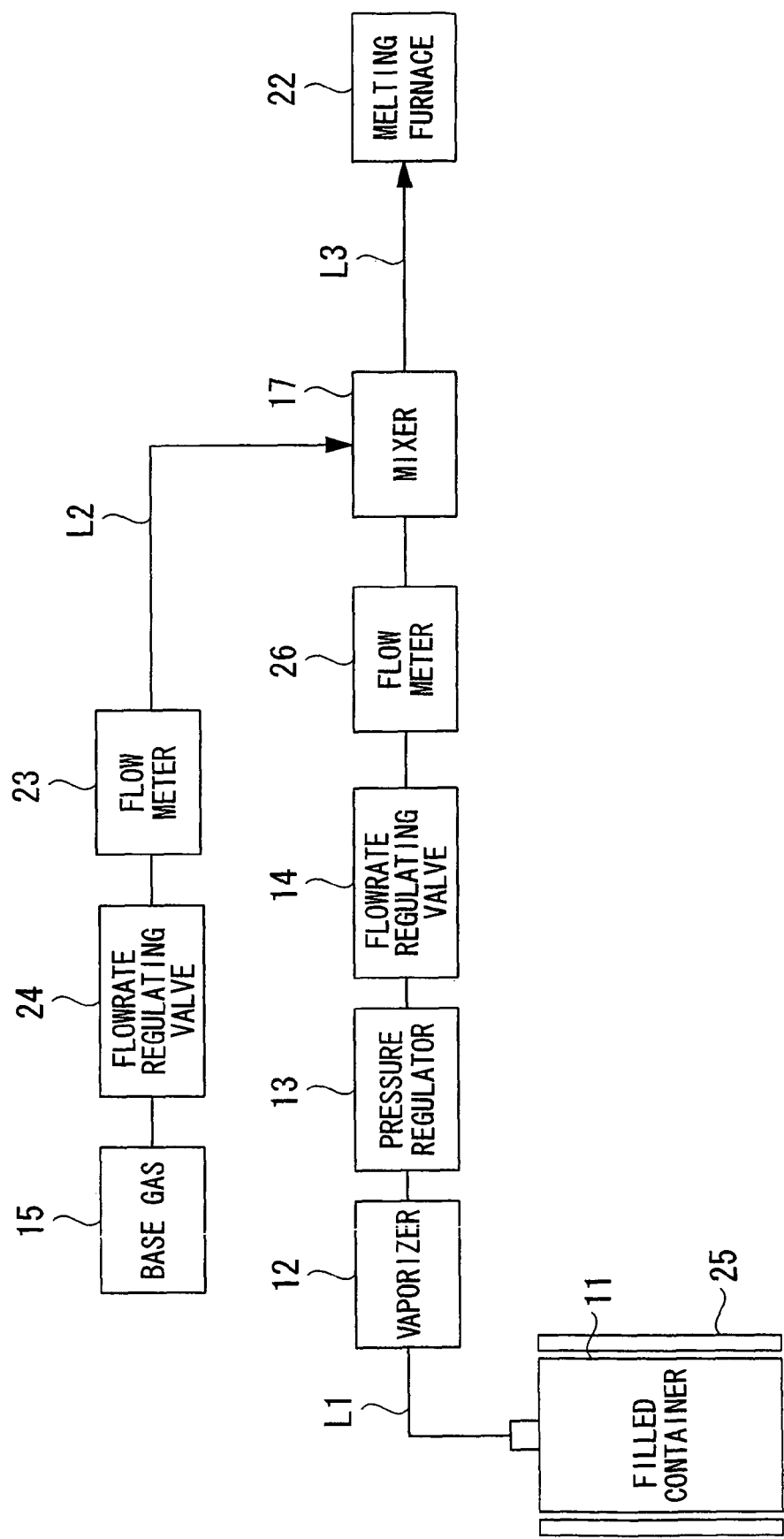
FIG. 6 is a rough schematic view depicting still another example of an apparatus for feeding a cover gas according to the invention.

FIG. 6 depicts still another example of the feeding apparatus according to the invention.

In the following description, parts which are common to those of the apparatuses depicted in FIG. 3 and FIG. 5 are given the same reference numerals, and the descriptions thereof are simplified or omitted.

The feeding apparatus is provided with a filled container 11, means 25 for heating a treatment in the filled container 11 (supercritical state-making means), a vaporizer 12, a pressure regulator 13, a flow rate regulating valve 14, a flow meter 26 for measuring the flow rate of a vaporized gas, a base gas feeding portion 15, a base gas flow meter 23, and a base gas flow rate regulating valve 24.

The feeding apparatus is characterized in that it comprises the heating means 25.

The heating means 25 is for putting carbon dioxide of the treatment in the filled container 11 in a supercritical state. An electric heater, a hot-air heater, hot-bath type heater, etc., may be used as the heating means 25.

It is preferable that the concentration of fluorinated ketone contained in the treatment in the filled container 11 be 0.1 to 20 wt % (preferably 0.4 to 8 wt %).

By setting the concentration of fluorinated ketone in this range, it is possible to prevent the molten metal protection effect of the cover gas from becoming short-lived. In addition, production of harmful substances can be suppressed.

If the concentration of fluorinated ketone is less than the above-described range, the concentration of fluorinated ketone of the cover gas is lowered after the treatment runs out of stock, and the molten metal protection effect is apt to become insufficient.

If the concentration of fluorinated ketone exceeds the above-described range, the treatment is made uneven, and the concentration of fluorinated ketone of the cover gas easily fluctuates. Also, harmful substances such as $COF_2$ are easily generated.

By heating the treatment in the filled container 11 using the heating means 25, carbon dioxide of the treatment is put in a supercritical state, whereby the carbon dioxide is made into a supercritical gas (a supercritical fluid).

In view of putting carbon dioxide of the treatment in a supercritical state, it is preferable that the temperature in the filled container 11 be 31° C. or more, and the pressure therein is 7.38 MPa or more.

By putting carbon dioxide of the treatment in a supercritical state, the treatment in the filled container 11 is put in a state where respective constituents are uniformly mixed, and the concentration of fluorinated ketone is made even. Therefore, in the feeding process, there is no case where the concentration of fluorinated ketone of the vaporized gas gradually increases.

It is preferable that, in the heating means 25, the temperature and pressure be kept sufficiently high so that the supercritical state of carbon dioxide is maintained until the treatment taken out from the filled container 11 reaches at least the pressure regulator 13. Thereby, the treatment can be fed into the pressure regulator 13 in a uniform state, and it is possible to prevent the concentration of fluorinated ketone of the cover gas from fluctuating.

The treatment including carbon dioxide which is put in a supercritical state is taken out from the filled container 11, and is introduced into the mixer 17 a substantially fixed flow rate via the vaporizer 12, pressure regulator 13, and flow rate regulating valve 14, and the base gas is simultaneously introduced into the mixer 17 at a substantially fixed flow rate through the channel L2.

A mixed gas obtained by mixing the base gas and the vaporized gas using the mixer 17 is fed into the melting furnace 22 through the channel L3 as a cover gas.

Since the feeding apparatus is provided with the heating means 25 for putting the treatment in a supercritical state, the concentration of fluorinated ketone of the treatment in the filled container 11 can be made uniform.

Accordingly, there is no case where the concentration of fluorinated ketone of the vaporized gas gradually increases in the feeding process, and it is possible to prevent the concentration of fluorinated ketone of the cover gas from fluctuating.

Also, since the concentration of fluorinated ketone of the treatment in the filled container 11 is made even, a lowering in the concentration of fluorinated ketone does not occur when the treatment runs out of stock. For this reason, it becomes possible to prevent the concentration of fluorinated ketone of the cover gas from fluctuating.

Furthermore, since it is not necessary to employ a control mechanism, it is possible to reduce the costs required for the facility.

In addition, in the invention, the treatment may be supplied after it is vaporized or may be supplied into the melting furnace 22 as it is as a liquid.

Example 1

Pentafluoroethyl-heptafluoropropyl ketone ($C_3F_7(CO)C_2F_5$) of 13 grams was fed into a pressure container 1 whose inner capacity was 10 L, and next liquid carbon dioxide of 6 grams was put therein so that the inner pressure of the container became 6 MPa.

A molten metal treatment in the pressure container 1 was led out at a flow rate of 9 grams per minute and was vaporized, and the concentration of $C_3F_7(CO)C_2F_5$ was periodically measured by an infrared ray type flon densitometer.

Figure 7:
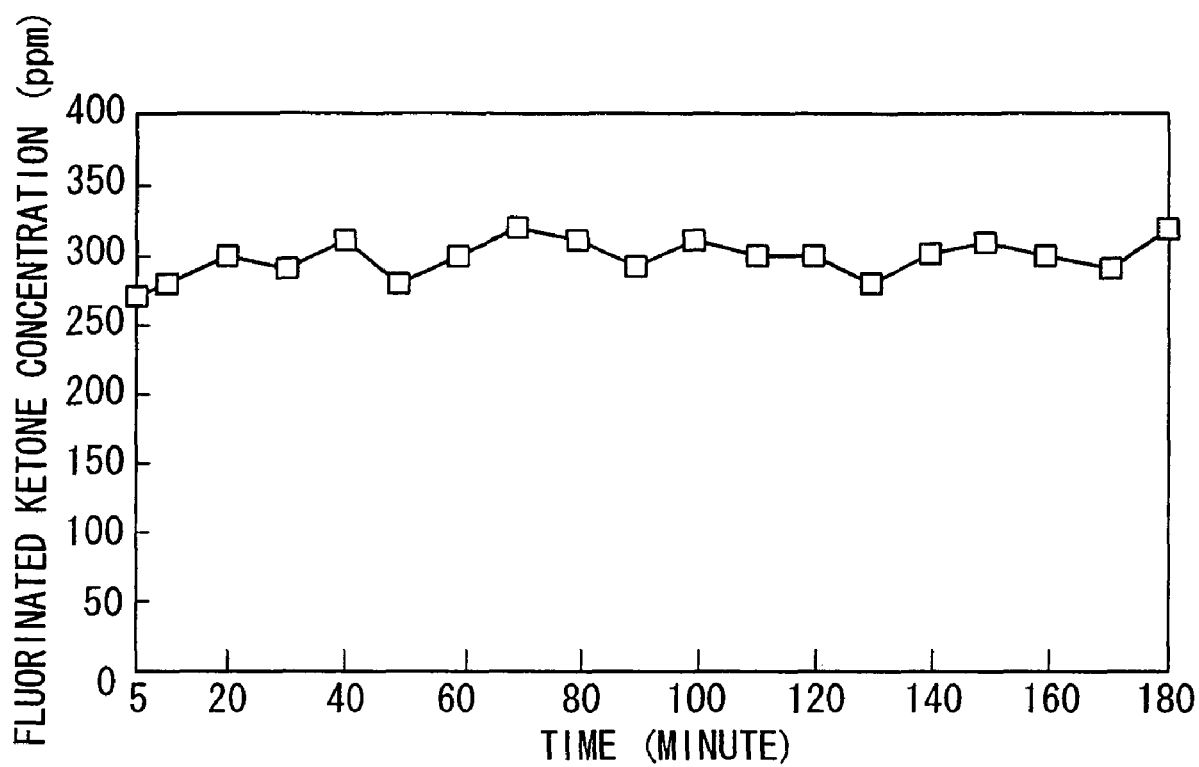
FIG. 7 is a graph depicting the results of tests.

The results of the measurements are depicted in FIG. 7.

Based on FIG. 7, it has been confirmed that the concentration of fluorinated ketone can be maintained in an almost fixed state.

Example 2

The molten metal treatment obtained in Example 1 was led out from the pressure container 1 at a flow rate of 9 grams per minute and was vaporized, and the treatment was contacted with 3 Kg of molten magnesium (at 680° C.) in a steel-made crucible (whose inner diameter was 125 mm, height was 245 mm, and thickness was 5 mm) for three hours.

As a result, it was confirmed that a film was formed on the surface of the molten magnesium, and the molten magnesium was not ignited.

For comparison, dry air was instead supplied after stopping feeding of the molten metal treatment, and the surface of the molten magnesium was ignited.

Example 3

An O-ring shaped test piece made of the materials shown in Table 1 was immersed in a molten metal treatment which was the same as that used in Example 1, and changes before and after immersion were investigated.

Also, changes in the hardness, weight and cubic content were calculated by an expression of (after-test value−before-test value)/before-test value×100.

TABLE 1

|  | Immersion conditions | | Change in hardness (%) | Change in weight (%) | Change in cubic content (%) |
|---|---|---|---|---|---|
|  | Temperature (° C.) | Time | | | |
| Neoprene rubber | 25 | 1 week | −1.8 | −0.6 | −1.2 |
|  | 100 | 1 week | −2.2 | +2.3 | +0.8 |

TABLE 1-continued

| | Immersion conditions | | Change in hardness (%) | Change in weight (%) | Change in cubic content (%) |
|---|---|---|---|---|---|
| | Temperature (° C.) | Time | | | |
| Butyl rubber | 25 | 1 week | −2.7 | +0.2 | +0.1 |
| | 100 | 1 week | −4.0 | +4.3 | +4.2 |
| Fluororubber | 25 | 1 week | −6.2 | +0.7 | +0.6 |
| | 100 | 1 week | −12.6 | +9.5 | +10.6 |
| Ethylene propylene rubber | 25 | 1 week | −4.7 | +0.6 | +0.3 |
| | 100 | 1 week | −5.7 | +3.3 | +2.4 |
| Silicone rubber | 25 | 1 week | — | +3.1 | +2.8 |
| | 100 | 1 week | −5.4 | +6.0 | +5.1 |
| Nitrile rubber | 25 | 1 week | −0.7 | −0.3 | −0.5 |
| | 100 | 1 week | +2.5 | +4.6 | +0.7 |

Example 4

A cover gas was fed into the melting furnace 22, using the feeding apparatus depicted in FIG. 3.

Pentafluoroethyl-heptafluoropropyl ketone of 510 grams and liquid carbon dioxide of 7 Kg were put in the filled container 11 whose inner capacity was 10 L at pressure of 6 MPa and were used as a treatment. Carbon dioxide was used as the base gas.

When feeding a cover gas, the concentration of fluorinated ketone of the cover gas was detected by the densitometer 18. The aperture of the flow rate regulating valve 14 was adjusted by the control portion 21 based on the detection value. The flow rate of the vaporized gas was controlled so that the quantity of fluorinated ketone introduced into the mixer 17 per unit time became substantially constant. Also, the vaporized gas was supplied at a ratio of 10 L per minute.

Figure 8:
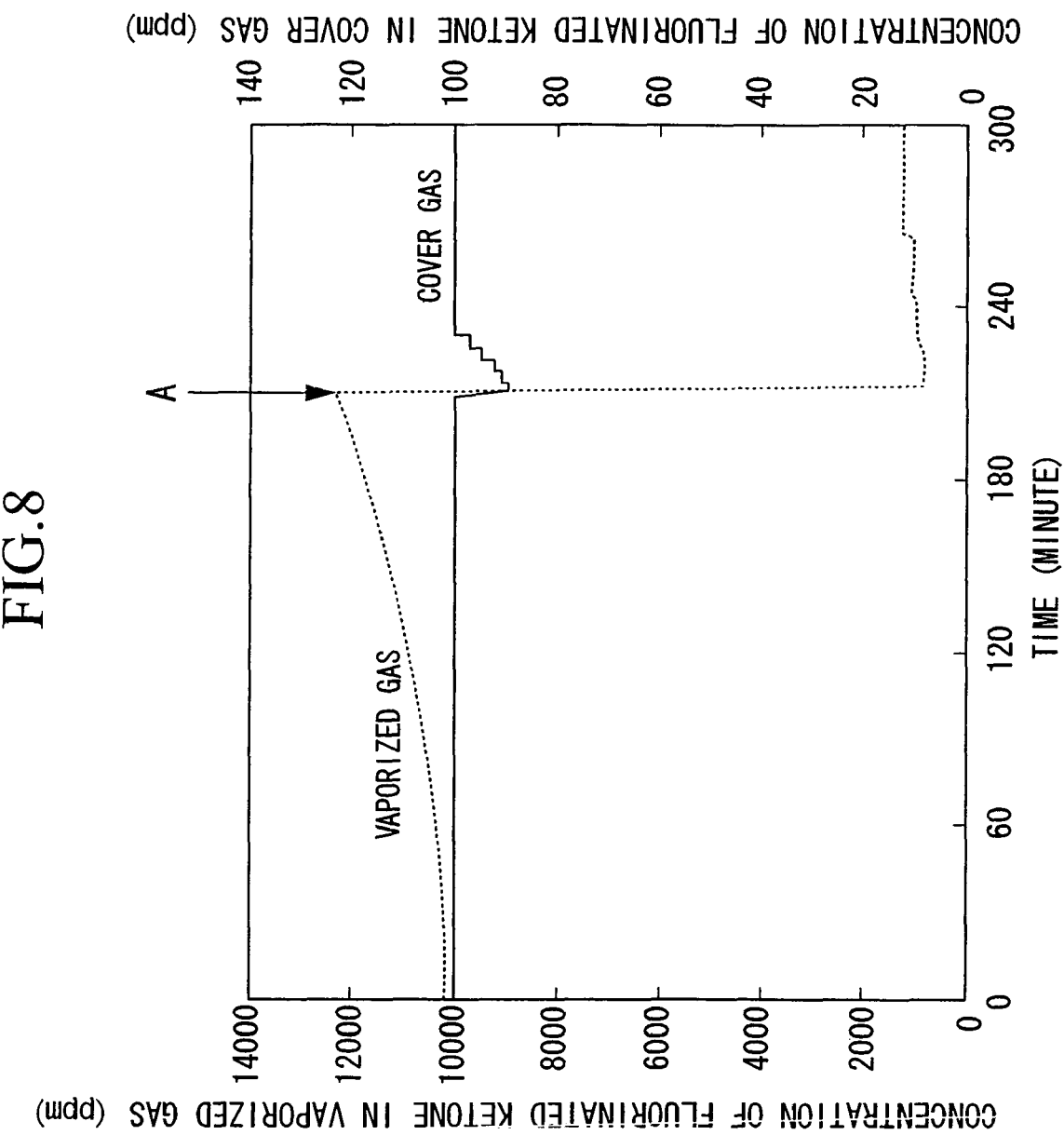
FIG. 8 is a graph depicting the results of tests.

FIG. 8 is a graph depicting a change over time in the concentration of fluorinated ketone of the vaporized gas and cover gas.

As depicted in this drawing, even in a case where the concentration of fluorinated ketone of the vaporized gas gradually increased, the concentration of fluorinated ketone of the cover gas was kept substantially constant.

Although the concentration of fluorinated ketone of the vaporized gas was radically lowered when the treatment ran out of stock (reference letter A), it was possible for the concentration of fluorinated ketone of the cover gas to be prevented from being remarkably lowered.

Example 5

Figure 9:
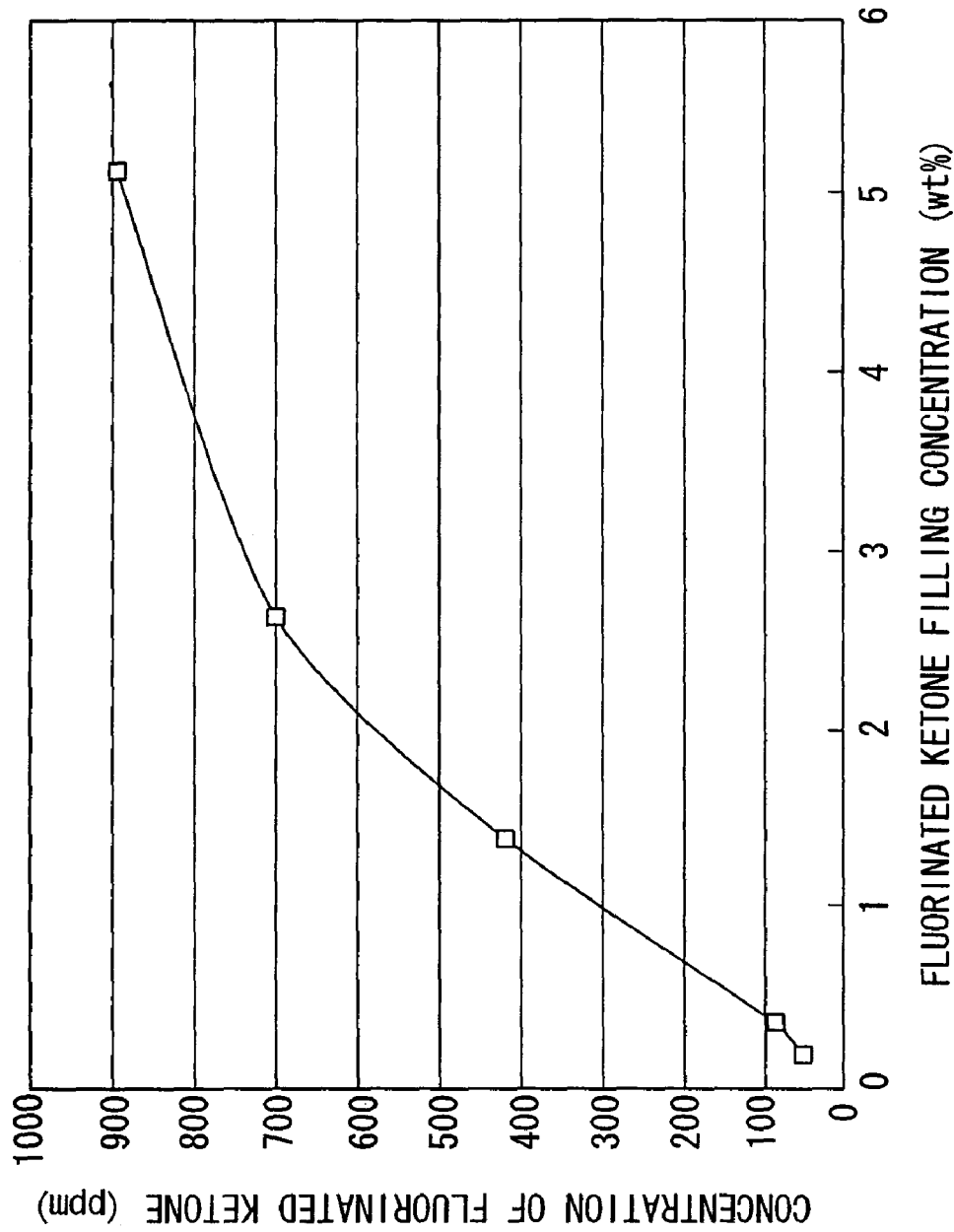
FIG. 9 is a graph depicting the results of tests.

FIG. 9 is a graph depicting the relationship between the concentration (fluorinated ketone supplying concentration) (abscissa) of fluorinated ketone of the treatment in the filled container 11 and the concentration (ordinate) of fluorinated ketone of the vaporized gas after the treatment ran out of stock.

Based on this drawing, by setting the supplying concentration of fluorinated ketone to 0.1 wt % or more, it was understood that the concentration of fluorinated ketone of the vaporized gas after running out of stock could be kept at 50 ppm or more.

Example 6

A cover gas was fed into the melting furnace 22, using the feeding apparatus depicted in FIG. 6.

Pentafluoroehtyl-heptafluoropropyl ketone of 510 grams and liquid carbon dioxide of 7 Kg were put in the filled container 1, whose inner capacity was 10 L, at pressure of 6 MPa, and were used as a treatment.

Using the heating means 25, the treatment in the filled container was heated to 35° C., and the pressure in the filled container 11 became 8 MPa.

The treatment was taken out from the filled container 11, a vaporized gas passed through the vaporizer 12 was fed into the mixer 17 at a substantially constant flow rate, and a base gas (carbon dioxide) was fed into the mixer 17 at substantially constant flow rate, and these gases were mixed. The vaporized gas was supplied at a rate of 10 L per minute.

Figure 10:
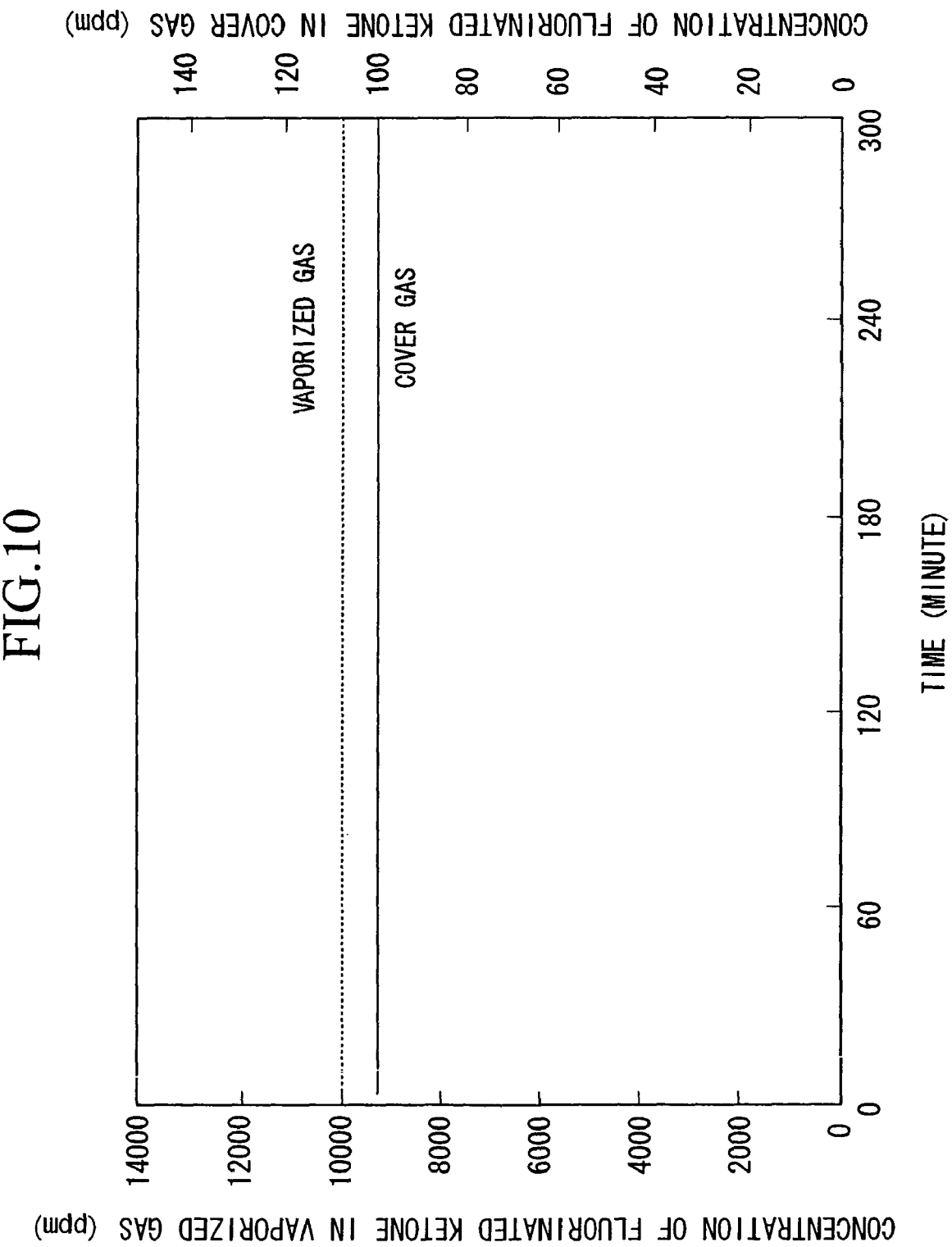
FIG. 10 is a graph depicting the results of tests.

FIG. 10 is a graph depicting changes over time in the concentration of fluorinated ketone of the vaporized gas and the cover gas. As depicted in this drawing, the densities of fluorinated ketone of the vaporized gas and the cover gas were made substantially constant.

INDUSTRIAL APPLICABILITY

The invention brings about the following effects.

(1) The molten metal treatment according to the invention is composed of a liquid mixture in which fluorinated ketone is dissolved in liquid carbon dioxide at 0.01 through 10 wt %.

Fluorinated ketone has a lower greenhouse effect and is a substance which can be easily decomposed in the air. Therefore, it is possible to prevent adverse influences on the environment.

(2) In the method for treating a molten metal according to the invention, since fluorinated ketone and liquid carbon dioxide, which are mixed in advance, are used, it is possible to surely make the mixing ratio of fluorinated ketone and liquid carbon dioxide constant, in comparison with a case where fluorinated ketone and liquid carbon dioxide, which are supplied by separate systems, are mixed immediately before use.

Therefore, it is possible to accurately determine the concentration of fluorinated ketone of the molten metal treatment. Accordingly, oxidization and vaporization of the molten metal can be surely prevented, and production of harmful substances ($COF_2$) can be suppressed. In addition, a decrease in costs can be brought about.

(3) Since, in the molten metal treatment according to the invention, a slight amount of fluorinated ketone and a great deal of liquid carbon dioxide are mixed, it is possible to keep the concentration of fluorinated ketone in leaked gas lower than the maximum permissible concentration even if the treatment leaks. This is advantageous in view of safety, and because handling can be facilitated.

(4) Since the cover gas feeding apparatus according to the invention is constructed so as to control the flow rate of the vaporized gas on the basis of a detection value of the concentration of fluorinated ketone of the cover gas, it is possible to suppress a fluctuation in the concentration of fluorinated ketone of the cover gas.

Therefore, a problem can be solved, in which the concentration of fluorinated ketone is gradually increased in the feeding process of the cover gas, that is, a problem in a case where a liquid treatment including liquid carbon dioxide as a solvent is used, and a stabilized effect of protecting a molten metal can be brought about.

(5) Since the cover gas feeding apparatus according to the invention can suppress a fluctuation in the concentration of fluorinated ketone of the cover gas, the quantity of use of fluorinated ketone can be reduced, and this is advantageous in view of costs.

(6) Since, in the cover gas feeding apparatus according to the invention, the only thing which must be controlled is only a flow rate of the vaporized gas, it is not necessary to control the flow rate of the base gas. Accordingly, the apparatus configuration can be simplified, and facility costs can be reduced.

(7) Since, in the invention, the concentration of fluorinated ketone of the treatment is set to 0.1 to 10 wt % (preferably, 0.4 to 8 wt %), it is possible to sufficiently increase the concentration of fluorinated ketone in the gas phase portion in the filled container.

Therefore, the concentration of fluorinated ketone of the vaporized gas after the treatment runs out of stock can be made sufficiently high, and it is possible to prevent the molten metal protection effect of the cover gas from becoming short-lived.

In addition, fluorinated ketone in the gas phase portion in the filled container can be utilized without any waste after the treatment runs out of stock. This is advantageous in view of costs.

(8) The concentration of fluorinated ketone of the cover gas is made to have a value responsive to the flow rate of the vaporized gas, not depending on the flow rate of the cover gas.

The cover gas feeding apparatus according to the invention is constructed to include a vaporization pressure regulator, a base gas pressure regulator and a cover gas flow rate regulating valve, wherein the flow rate of the base gas increases and decreases to prevent a fluctuation in the flow rate even if the flow rate of the vaporized gas is increased or decreased when the flow rate of feeding the cover gas is set to a predetermined value.

Therefore, it is possible to make the concentration of fluorinated ketone of the cover gas substantially constant regardless of the flow rate of feeding the cover gas.

(9) Since the cover gas feeding apparatus according to the invention utilizes supercritical state-making means by which carbon dioxide of a molten metal treatment in the filled container can be put in a supercritical state, it is possible to make the concentration of fluorinated ketone of the treatment in the filled container uniform.

For this reason, there is no case where the concentration of fluorinated ketone of the vaporized gas gradually increases in the feeding process, wherein it is possible to prevent the concentration of fluorinated ketone of the cover gas from fluctuating.

Also, since the concentration of fluorinated ketone of the treatment in the filled container can be made uniform, there is no case where the concentration of fluorinated ketone is lowered when the treatment runs out of stock.

Further, since no control mechanism is required, costs for the facility can be reduced.

The invention claimed is:

1. A molten metal treatment composition used for a cover gas brought into contact with a surface of the molten metal, comprising a liquid mixture in which fluorinated ketone is dissolved in a liquid carbon dioxide at 0.01 to 10 wt %, and oxygen, the concentration of the oxygen being 0.4 to 10 ml/L.

2. The molten metal treatment composition according to claim 1 wherein the fluorinated ketone is one or more which is selected from perfluorinated ketone, hydrogenated fluorinated ketone, and mixtures thereof.

3. The molten metal treatment composition according to claim 2, wherein the fluorinated ketone is perfluorinated ketone, and the perfluorinated ketone is one or more which is selected from the group consisting of $CF_3CF_2C(O)CF(CF_3)_2$, $(CF_3)_2CFC(O)CF(CF_3)_2$, $CF_3(CF_2)_2C(O)CF(CF_3)_2$, $CF_3(CF_2)_3C(O)CF(CF_3)_2$, $CF_3(CF_2)_5C(O)CF_3$, $CF_3CF_2C(O)CF_2CF_2CF_3$, $CF_3C(O)CF(CF_3)_2$, and perfluorocyclo-hexanone.

4. The molten metal treatment composition according to claim 2, wherein the fluorinated ketone is hydrogenated fluorinated ketone, and the hydrogenated fluorinated ketone is one or more which is selected from the group consisting of $HCF_2CF_2C(O)CF(CF_3)_2$, $CF_3C(O)CH_2C(O)CF_3$, $C_2H_5C(O)CF(CF_3)_2$, $CF_2CF_2C(O)CH_3$, $(CF_3)_2CFC(O)CH_3$, $CF_3CF_2C(O)CHF_2$, $CF_3CF_2C(O)CH_2F$, $CF_3CF_2C(O)CH_2CF_3$, $CF_3CF_2C(O)CH_2CH_3$, $CF_3CF_2C(O)CH_2CHF_2$, $CF_3CF_2C(O)CH_2CHF_2$, $CF_3CF_2C(O)CH_2CH_2F$, $CF_3CF_2C(O)CHFCHF_2$, $CF_3CF_2C(O)CHFCH_2F$, $CF_3CF_2C(O)CF_2CH_3$, $CF_3CF_2C(O)CF_2CHF_2$, $CF_3CF_2C(O)CF_2CH_2F$, $(CF_3)_2CFC(O)CHF_2$, $(CF_3)_2CFC(O)CH_2F$, $CF_3CF(CH_2F)C(O)CHF_2$, $CF_3CF(CH_2F)C(O)CH_2F$, and $CF_3CF(CH_2F)C(O)CF_3$.

5. The molten metal treatment composition according to claim 1, wherein the fluorinated ketone is $C_3F_7(CO)C_2F_5$.

6. The molten metal treatment composition according to claim 1, wherein the treatment is put in a container in a liquid state.

7. The molten metal treatment composition according to claim 6, wherein the container is composed of one or more which is selected from the group of members made of synthetic resin, at least the surface of which is made of neoprene rubber, butyl rubber, fluororubber, ethylene propylene rubber, silicone rubber, nitrile rubber, Teflon (registered trade mark), nylon, Delrin (registered trade mark), and Daiflon (registered trade mark), among those with which the molten metal treatment is brought into contact.

8. The molten metal treatment composition according to claim 1, wherein the liquid carbon dioxide is in a supercritical state, in which the temperature is 31° C. or more and the pressure is 7.38 MPa or more.

* * * * *